(12) United States Patent  
Chang (10) Patent No.: US 6,478,591 B1  
(45) Date of Patent: Nov. 12, 2002

(54) CARD EJECTION MECHANISM FOR ELECTRICAL CARD CONNECTOR

(75) Inventor: Jen Jou Chang, Yung-Cho (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/039,401

(22) Filed: Oct. 29, 2001

(30) Foreign Application Priority Data

Aug. 3, 2001 (TW) ...................................... 90213255 U (51) Int. Cl.⁷ .............................................. H01R 13/62
(52) U.S. Cl. ...................................................... 439/159
(58) Field of Search ................................. 439/159, 160, 439/630, 157; 235/441, 475

(56) References Cited

U.S. PATENT DOCUMENTS

| | | | | | |
|---|---|---|---|---|---|
| 5,421,737 A | * | 6/1995 | Chen et al. | ................. | 439/157 |
| 6,230,978 B1 | * | 5/2001 | Koseki et al. | ............... | 235/475 |
| 6,319,028 B1 | * | 11/2001 | Zhang et al. | ................ | 439/159 |
| 6,319,029 B2 | * | 11/2001 | Nishioka | ..................... | 439/159 |
| 6,332,791 B1 | * | 12/2001 | Wang et al. | ................. | 439/159 |

* cited by examiner

*Primary Examiner*—Gary R Paumen  
(74) *Attorney, Agent, or Firm*—Wei Te Chung (57) ABSTRACT

An electrical card connector (5) includes a shell (1), an insulative body (2) covered by the shell, a plurality of terminals (3) received in the body, and a card ejection mechanism (4) mounted in the body. The card ejection mechanism includes a slide block (40), an elastic element (42), a push bar (44), and an elastic piece (46). When an electrical card (6) is inserted into the connector, the slide block is pushed inwardly until it is engaged by the elastic piece. The card is thus securely retained in the connector, with the elastic element being compressed. To eject the card, the push bar is manually pushed inwardly. The push bar gradually forces the elastic piece away from the slide block. The elastic element decompresses, pushing the slide block back out.

1 Claim, 7 Drawing Sheets

CARD EJECTION MECHANISM FOR ELECTRICAL CARD CONNECTOR

BACKGROUND OF THE INVENTION

1. Field of the Invention

The present invention relates to electrical card connectors, and particularly to card ejection mechanisms for electrical card connectors.

2. Related Art of the Invention

As electronics technology advances, a variety of electrical cards are being developed to expand the functions and capability of electronic devices such as portable computers and digital cameras. Electrical connectors are used to connect the cards to the devices, so that processing units in the devices can access information stored in the cards. Card ejection mechanisms in the connectors allow convenient manual changeover of cards when required.

A conventional card ejection mechanism includes a push bar and an ejecting bar respectively positioned near a side arm and a header of an electrical card connector. The ejecting bar forms an ejector at one end thereof that is distant from the push bar. A connecting piece connects the push bar with the ejecting bar such that when the push bar is pushed toward the header, the card ejecting bar moves away from the header to push an inserted card away from the header. The card is disengaged from the header and can be readily taken out of the connector. Conventional card ejection mechanisms are shown in U.S. Pat. Nos. 5,421,737 and 6,230,978. These mechanisms require a relatively large number of components in a complicated structure. Accordingly, the mechanisms are unduly difficult to manufacture and assemble.

Hence, an improved card ejection mechanism for an electrical card connector is desired to overcome above-described problems.

SUMMARY OF THE INVENTION

An object of the present invention is to provide a card ejection mechanism for an electrical card connector that has relatively few components and a simple structure, thereby facilitating manufacture, assembly, operation and cost-reduction.

To accomplish the above-mentioned object, an electrical card connector according to the present invention includes a shell, an insulative body covered by the shell, a plurality of terminals received in the body, and a card ejection mechanism mounted in the body. The card ejection mechanism includes a slide block, an elastic element, a push bar, and an elastic piece. When an electrical card is inserted into the connector, the slide block is pushed inwardly until it is engaged by the elastic piece. The card is thus securely retained in the connector, with the elastic element being compressed. To eject the card, the push bar is manually pushed inwardly. The push bar gradually forces the elastic piece away from the slide block. The elastic element decompresses, pushing the slide block back out.

Further objects and advantages of the present invention will become more apparent from a consideration of the drawings and the following detailed description.

BRIEF DESCRIPTION OF THE INVENTION

DETAIL DESCRIPTION OF THE INVENTION

Figure 1:
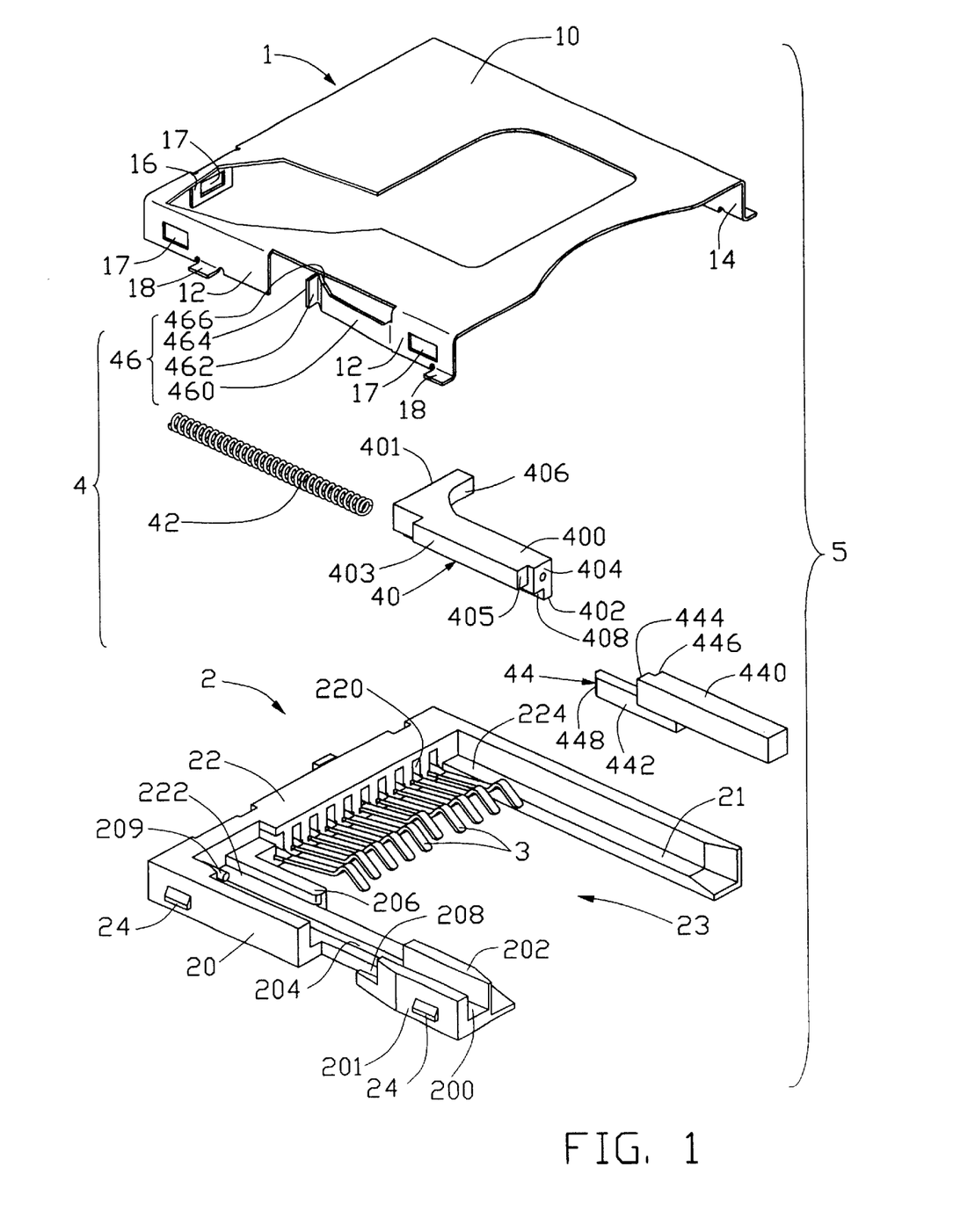
FIG. 1 is an exploded perspective view of an electrical card connector according to a preferred embodiment of the present invention, with a portion of a shell of the connector cut away for clarity.

The present invention will now be introduced in detail by referring to the accompanying drawings. Referring to FIG. 1, an electrical card connector 5 according to the present invention includes a shell 1, an insulative body 2 covered by the shell 1, a plurality of terminals 3 received in a header 22 of the insulative body 2, and a card ejection mechanism 4 mounted on a first side arm 20 of the insulative body 2.

The shell 1 includes a top wall 10, a first sidewall 12, a second sidewall 14, and a rear wall 16. The first and second sidewalls 12, 14 and the rear wall 16 depend from the top wall 10, and define retaining holes 17 therein. A plurality of soldering feet 18 extends outwardly from bottom edges of the two sidewalls 12 and 14, for soldering the electrical card connector 5 onto a printed circuit board (not shown). The first sidewall 12 is divided into forward and rearward parts. An elastic piece 46 extends rearwardly from the forward part of the first sidewall 12, and is positioned between the forward and rearward parts.

The insulative body 2 is generally U-shaped, and includes the header 22, the first side arm 20 and a second side arm 21. The first and second side arms 20, 21 extend perpendicularly from opposite ends of the header 22 respectively, and are parallel to each other. The header 22 defines a plurality of receiving holes 220 to receive the terminals 3. A plurality of fasteners 24 is formed on outer faces of the header 22 and the first and second arms 20, 21 respectively, to engage in the retaining holes 17 of the rear wall 16 and first and second sidewalls 12, 14 of the shell 1. The insulative body 2 engaged with the shell 1 thereby defines a receiving cavity 23 to receive an electrical card 6 (see FIG. 4).

The first and the second side arms 20, 21 respectively form a first and a second slideway 222, 224 thereon, to facilitate insertion of the card 6. An outer wall 201 and an inner wall 202 extend upwardly from opposite sides of a front portion of the first side arm 20 respectively. A passageway 200 is defined between the outer and inner walls 201, 202. A longitudinal slide groove 204 (see FIGS. 1 and 3) is defined in the first side arm 20, generally between the first slideway 222 and the passageway 200. The slide groove 204 is defined from the header 22 through to the inner wall 202. A notch 208 is defined in a rear end of the outer wall 201, in communication with the passageway 200. An L-shaped block 206 is integrally formed in a corner where the first side arm 20 joins with the header 22. The block 206 has a longitudinal part adjoining the first slideway 222. A stud 209 extends from an inner wall of the header 22 over the first slideway 222, and is parallel to the slide groove 204.

The card ejection mechanism 4 is mounted to the first side arm 20. The ejection mechanism 4 includes a slide block 40, an elastic element 42, a push bar 44, and the elastic piece 46 integrated with the shell 1.

The slide block 40 is generally L-shaped. The slide block 40 includes a supporting arm 400, and a retaining arm 401 extending perpendicularly from a rear end of the supporting arm 400. A slide arm 402 and a blocking arm 403 extend from a lower surface and an outside surface of the supporting arm 400, respectively. A guideway 408 is formed in the lower surface of the supporting arm 400 beside the slide arm 402. The supporting arm 400 and the slide arm 402 have a common front face 404. A hole (not visible) is defined in a rear face of the retaining arm 401 that is opposite to the front face 404, for receiving the elastic element 42. The blocking arm 403 has a blocking face 405 parallel to but rearward of the front face 404. The retaining arm 401 has an inner face 406, for engaging with the card 6.

The elastic element 42 can, for example, be a coil spring. One end of the elastic element 42 engages with the stud 209 of the insulative body 2, and an opposite end of the elastic element 42 is received in the hole (not visible) of the rear face of the retaining arm 401.

The push bar 44 has a front push arm 440, and an interfering arm 442 extending from a lower surface of the push arm 440 and rearwardly from the push arm 440. Thus the push arm 440 partly overlaps the interfering arm 442. The push arm 440 forms a step at a rear end thereof, thereby forming a first interface 444 and a second interface 446. The second interface 446 is located forward of the first interface 444. The interfering arm 442 forms a beveled interfering face 448 at a rear end thereof. The interfering face 448 is formed at an angle of 45 degrees to a rear face of the interfering arm 442.

The elastic piece 46 integrated with the shell 1 has an elastic arm 460 and a hooked blocking portion 462. The elastic arm 460 extends rearwardly from the forward part of the first sidewall 12 of the shell 1. The blocking portion 462 is at a free end of the elastic arm 460. The blocking portion 462 has a contacting face 464 and a bevel face 466. The contacting and bevel faces 464, 466 are formed with a predetermined angle therebetween.

Figure 2:
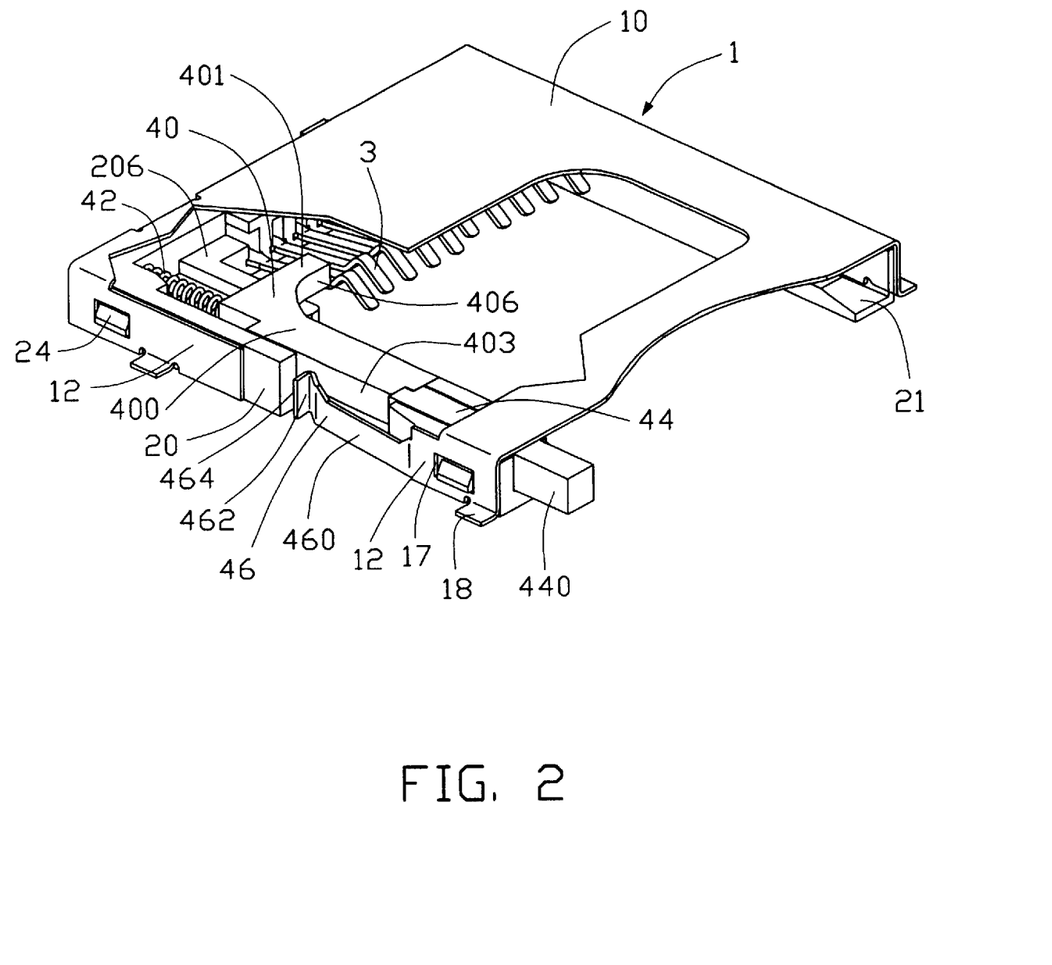
FIG. 2 is an assembled view of FIG. 1, with a portion of the shell of the connector cut away for clarity.
Figure 3:
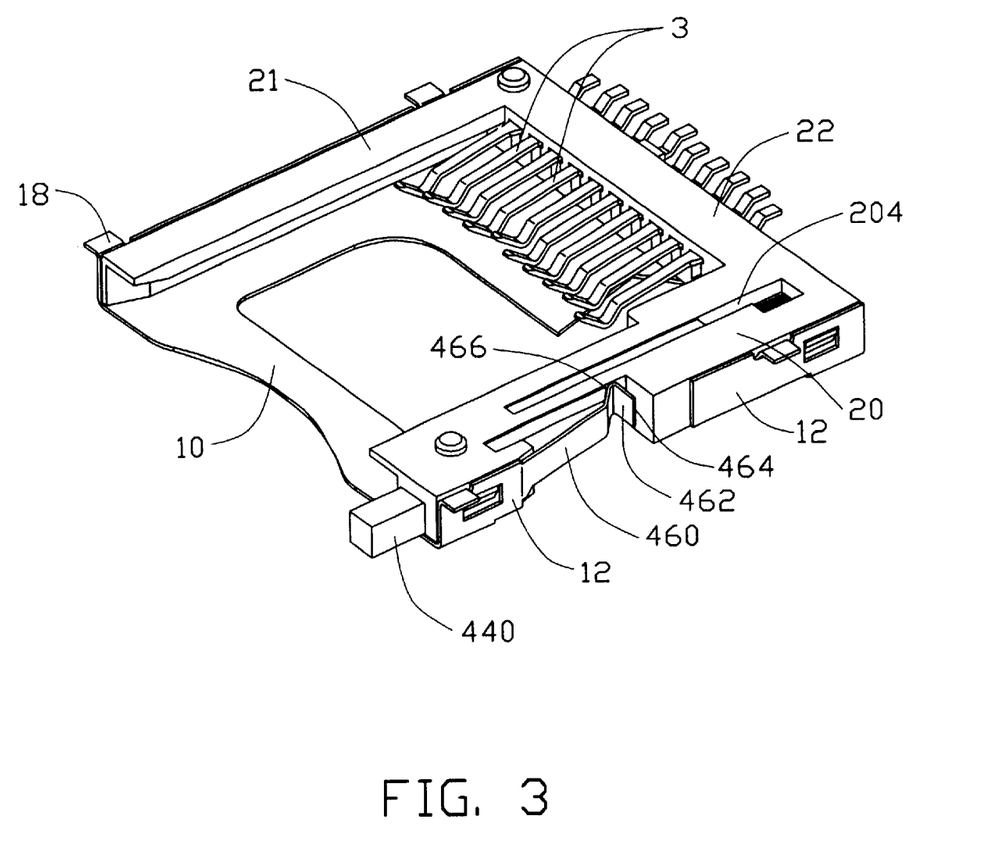
FIG. 3 is similar to FIG. 2, but viewed from a reverse aspect.

FIGS. 2 and 3 are two views of the electrical card connector 5 fully assembled. The elastic element 42 is in a relaxed state. The slide block 40 is positioned on the first side arm 20. The slide arm 402 is inserted in the slide groove 204, and the retaining arm 401 is positioned on the L-shaped block 206. The retaining arm 401 is parallel to the header 22. The push bar 44 is also located on the first side arm 20. The push arm 440 is slideably positioned in the passageway 200, and the interfering arm 442 is slideably engaged in the notch 208. The slide block 40 is in contact with the push bar 44. The blocking face 405 and the front face 404 of the slide block 40 are in contact with the first interface 444 and the second interface 446 of the push arm 440, respectively. The interfering arm 442 of the push bar 44 lies under the guideway 408 of the slide block 40.

The shell 1 is secured to the insulative body 2 to cover it. The retaining holes 17 of the shell 1 fittingly receive the fasteners 24 of the insulative body 2. The hooked blocking portion 462 of the elastic piece 46 deforms to press against an outer face of the blocking arm 403 of the slide block 40.

Figure 4:
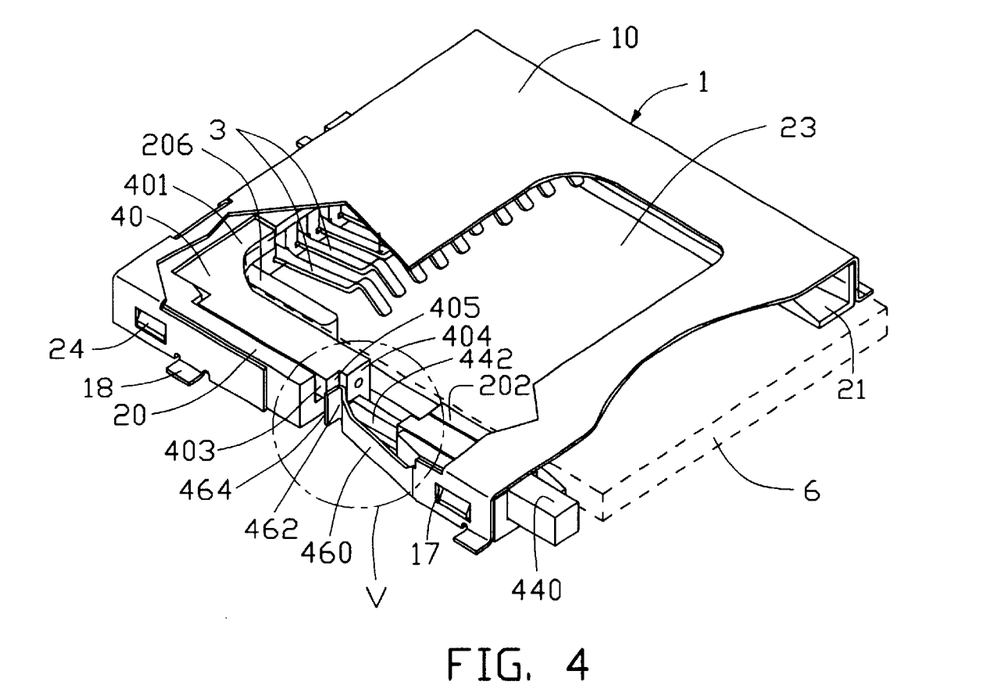
FIG. 4 is similar to FIG. 2, but showing an electrical card inserted into the connector.
Figure 5:
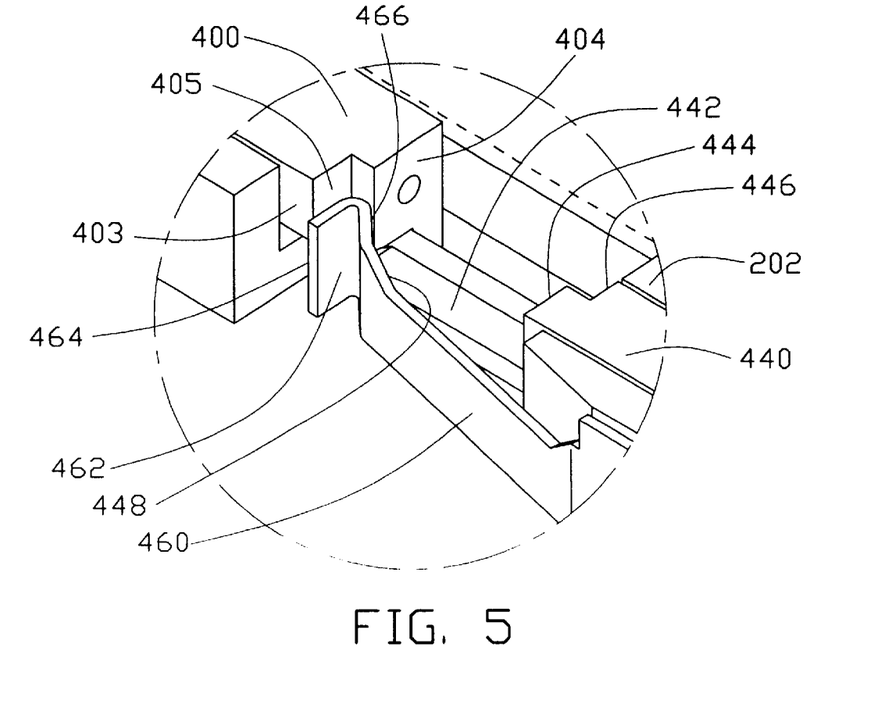
FIG. 5 is an enlarged view of a circled portion V of FIG. 4.
Figure 6:
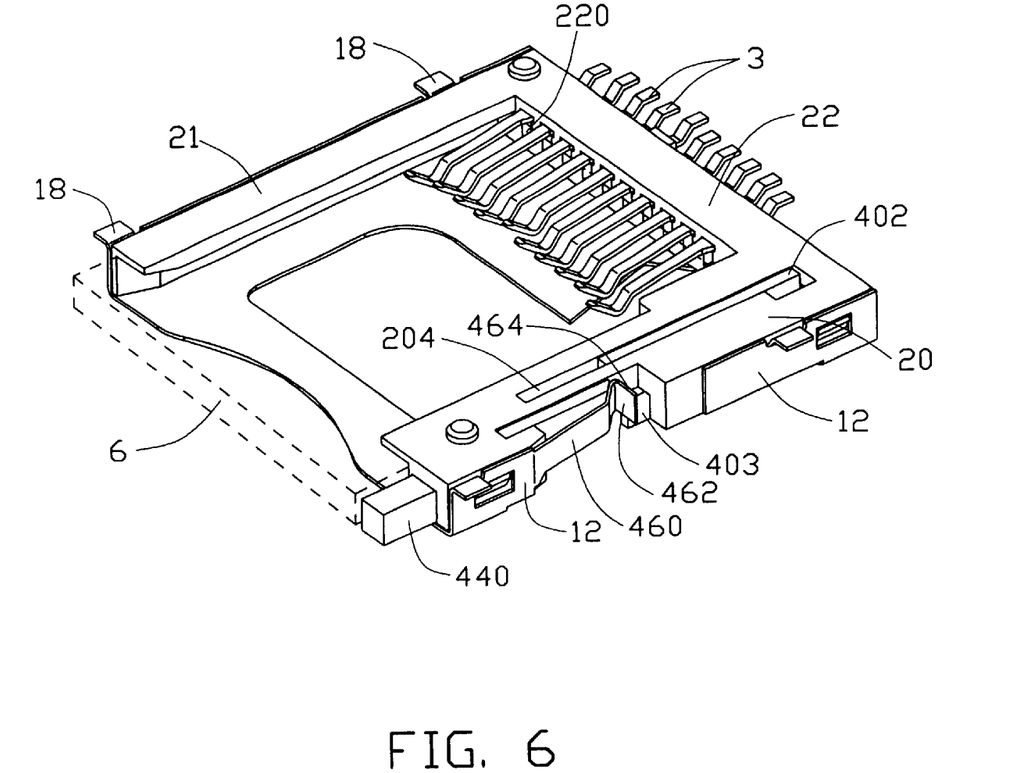
FIG. 6 is similar to FIG. 3, but showing the electrical card inserted into the connector.

Referring to FIGS. 4, 5 and 6, the card 6 is inserted into the electrical card connector 5 by sliding the card 6 along the slideways 222, 224. The card 6 engages with the retaining arm 401 of the slide block 40, and pushes the slide block 40 to slide along the slide groove 204 toward the header 22. The slide block 40 moves away from the push bar 44, and the elastic element 42 is compressed. The retaining arm 401 of the slide block 40 slides on the L-shaped block 206. Finally the blocking arm 403 of the slide block 40 passes over the blocking portion 462 of the elastic piece 46, and the contacting face 464 of the blocking portion 462 engages with the blocking face 405 of the blocking arm 403. The slide block 40 is retained in this position and prevented from returning to its original position. In this position, the card 6 is electrically connected with the terminals 3. The slide block 40 is able to return to its original position under force of the compressed elastic element 42, once the contacting face 464 of the blocking portion 462 is disengaged from the blocking face 405 of the blocking arm 403.

To eject the card 6, the push bar 44 is manually pushed toward the header 22. The interfering arm 442 slides under the guideway 408. The interfering face 448 of the interfering arm 442 first engages with a lower portion of the bevel face 466 of the blocking portion 462. The interfering face 448 gradually forces the blocking portion 462 to move away from the blocking face 405 of the blocking arm 403. Once the contacting face 464 of the blocking portion 462 has been disengaged from the blocking face 405, the slide block 40 returns to its original position under force of the compressed elastic element 42. The card 6 is thereby motivated to an ejected position by the slide block 40. A user can then conveniently remove the card 6 from the electrical card connector 5, and insert a new card when necessary.

Figure 7:
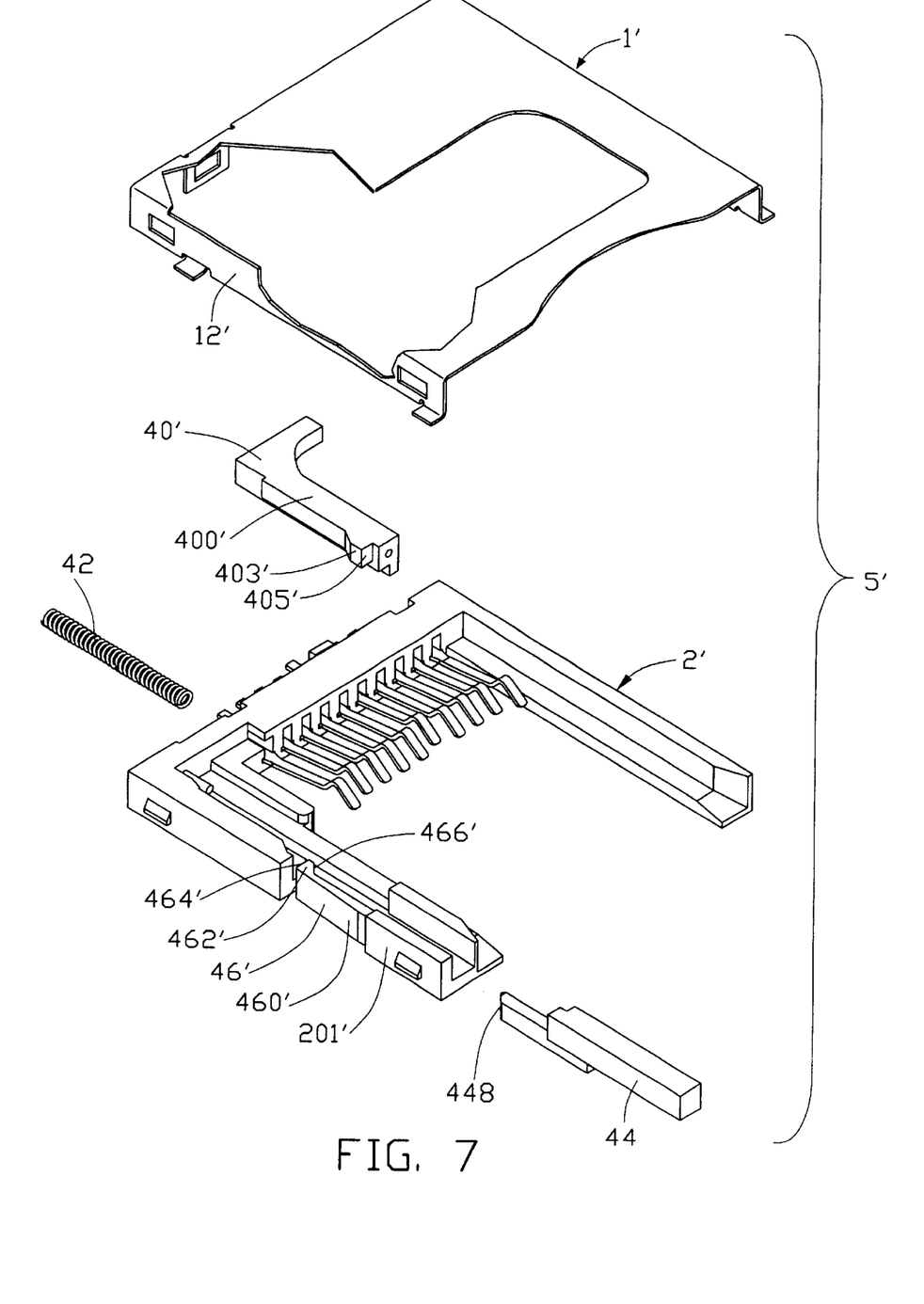
FIG. 7 is an exploded perspective view of an electrical card connector according to an alternative embodiment of the present invention, with a portion of a shell of the connector cut away for clarity.
Figure 8:
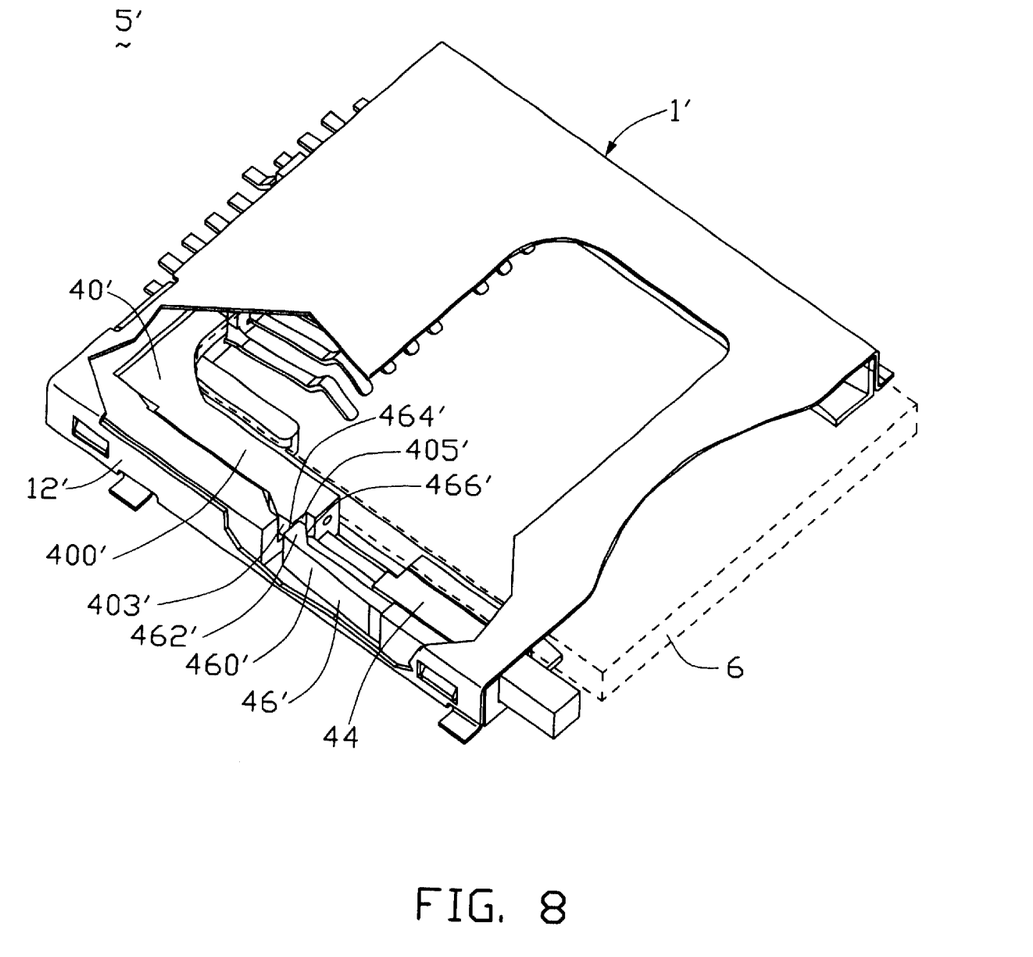
FIG. 8 is an assembled view of FIG. 7, and showing the electrical card inserted into the connector.

In the electrical card connector 5, the elastic piece 46 is integrally formed with the shell 1. FIGS. 7 and 8 show an electrical card connector 5' according to an alternative embodiment of the present invention. Except for the following differences, the alternative embodiment is similar to the above-described preferred embodiment. The connector 5' has an elastic piece 46' which is integrally formed with an insulative body 2'. Furthermore, the connector 5' has a shell 1' which is substantially the same as the shell 1 of the preferred embodiment. However, the shell 1' has a continuous first sidewall 12', and does not have the elastic piece 46 of the preferred embodiment. An L-shaped slide block 40' has a protrusion 403' formed on an outer side surface of a supporting arm 400' thereof. The protrusion 403' has a front blocking face 405'. The insulative body 2' has an outer wall 201'. The elastic piece 46' is integrally formed with the outer wall 201', and has an elastic body 460' extending rearwardly from the outer wall 201'. A hook 462' is inwardly formed at a free end of the elastic body 460'. The hook 462' has a rear contacting face 464', and a front bevel face 466'. When the card 6 is inserted into the connector 5', the rear contacting face 464' of the elastic piece 46' abuts against the front blocking face 405' of the slide block 40'. The card 6 is thereby held in the inserted position, and is electrically connected with terminals of the connector 5'. When the push bar 44 is pushed inwardly, a beveled interfering face 448 of the push bar 44 gradually pushes the hook 462' outwardly. This causes the rear contacting face 464' to disengage from the front blocking face 405'. The slide block 40' returns to its original position under force of the compressed elastic element 42. The card 6 is thereby motivated to an ejected position by the slide block 40'.

While the present invention has been described with reference to a specific embodiment thereof, the description is illustrative and is not to be construed as limiting the invention. It is apparent that various changes may be made in the form, construction, and arrangement of parts of the present invention without departing from its spirit or scope, or sacrificing all of its material advantages.

I claim:

1. An electrical card connector, comprising:

a metal shell having a top wall and a sidewall extending from the top wall;

an insulative body covered by the shell and having a header, a side arm extending from an end of the header;

a plurality of terminals received in the insulative body; and a card ejection mechanism comprising a slide block slideably mounted on the side arm near the header, the slide block being adapted for ejecting a card inserted into the connector, the card ejection mechanism further comprising an elastic element compressed between the slide block and the header of the insulative body, a push bar slideably mounted on the side arm near a free end thereof, and an elastic piece engaging with an end face of the slide block thereby preventing the slide block from moving away from the header of the insulative body, movement of the push bar toward the header of the insulative body motivating the elastic piece to disengage from the slide block whereby the slide block is pushed away from the header of the insulative body by the elastic member;

wherein the sidewall of the shell comprises forward and rearward parts, and the elastic piece of the card ejection mechanism integrally extends rearwardly from the forward part of the sidewall and is positioned between the two parts;

wherein the elastic piece has an elastic arm that extends rearwardly from the forward part of the sidewall, and further has a hooked blocking portion at a free end of the elastic arm;

wherein the side arm defines a void therein to slidably receive the elastic arm;

wherein the slide block forms a blocking face rearwardly of a front face thereof, the blocking portion of the elastic piece engaging the blocking face when the card is inserted in the connector;

wherein the push bar has an interfering arm sliding in the void of the side arm, the interfering arm forms a beveled interfering face on a rear surface thereof, and the interfering face presses the blocking portion when the card is ejected from the connector;

wherein an outer wall and an inner wall are formed at a front end of the side arm of the insulative body, the outer and inner walls define a passageway therebetween, and the push bar is slidably positioned in the passageway;

wherein the side arm has a slideway formed thereon, a longitudinal slide groove is defined at the slideway, the slide block forms a slide arm extending from a bottom surface thereof, the slide arm slidably engages in the slide groove, and the slide block is slidably positioned on the slideway of the side arm;

wherein the slide block is L-shaped, and has a transverse retaining arm engaging with the card inserted in the connector;

wherein the insulative body fuirther has a stud extending from an inner wall of the header above the side arm, the stud is parallel to the side arm, and the stud engages with one end of the elastic element of the card ejecting mechanism.

* * * * *